United States Patent [19]

Nishi et al.

[11] Patent Number: 5,965,275
[45] Date of Patent: Oct. 12, 1999

[54] ADHESIVE FLUORINE-CONTAINING POLYMER AND LAMINATE EMPLOYING IT

[75] Inventors: Eiichi Nishi; Kazutoshi Sugitani, both of Kawasaki; Seitoku Kaya, Tokyo; Masayuki Saito; Haruhisa Miyake, both of Yokohama, all of Japan

[73] Assignee: Asahi Glass Company Ltd., Tokyo, Japan

[21] Appl. No.: 08/984,951

[22] Filed: Dec. 4, 1997

Related U.S. Application Data

[62] Division of application No. 08/858,620, May 19, 1997, Pat. No. 5,736,610, which is a continuation of application No. 08/330,869, Oct. 28, 1994, abandoned.

[30] Foreign Application Priority Data

| Oct. 28, 1993 | [JP] | Japan | 5-270771 |
| Oct. 28, 1993 | [JP] | Japan | 5-270772 |
| Oct. 28, 1993 | [JP] | Japan | 5-270773 |

[51] Int. Cl.$^6$ .................................................. B32B 27/08
[52] U.S. Cl. .................. 428/475.8; 428/483; 428/516; 525/276
[58] Field of Search .................. 525/276; 428/475.8, 428/483, 516

[56] References Cited

U.S. PATENT DOCUMENTS

| 4,506,035 | 3/1985 | Barnett et al. . |
| 5,003,008 | 3/1991 | Kobayashi . |
| 5,010,121 | 4/1991 | Yentes et al. . |
| 5,087,675 | 2/1992 | Takeo et al. . |

FOREIGN PATENT DOCUMENTS

| 1 255 493 | 12/1971 | United Kingdom . |

OTHER PUBLICATIONS

Database WPI, Derwent Publications, AM–94–352174, JP–6–275136, Sep. 30, 1994.

Database WPI, Derwent Publications, AM–82–48934E, JP–57–073027, May 7, 1982.

*Primary Examiner*—Bernard Lipman
*Attorney, Agent, or Firm*—Oblon, Spivak, McClelland, Maier & Neustadt, P.C.

[57] ABSTRACT

An adhesive fluorine-containing polymer comprising a fluorine-containing polymer having hydrogen atoms bonded to carbon atoms of its main chain and a grafting compound having a linking group capable of grafting to the fluorine-containing polymer and a functional group capable of providing an adhesive property, grafted to the fluorine-containing polymer.

7 Claims, No Drawings

ND LAMINATE EMPLOYING IT

ADHESIVE FLUORINE-CONTAINING POLYMER AND LAMINATE EMPLOYING IT

This application is a Divisional of application Ser. No. 08/858,620, filed on May 19, 1997, now U.S. Pat. No. 5,736,610, which is a continuation of 08/330,869 filed Oct. 28, 1994, abandoned.

The present invention relates to an adhesive fluorine-containing polymer which can be firmly bonded to substrates made of various organic materials or inorganic materials, and a laminate prepared by using it.

A fluorine-containing polymer is excellent in the chemical resistance, weather resistance and surface properties and thus is widely used in many fields. One of applications of such a fluorine-containing polymer is an application as a laminate. For example, an application as a surface coating material is known in which e.g. a film of a fluorine-containing polymer is laminated on the surface of a substrate made of an inorganic material or an organic material such as a synthetic resin, to cover the substrate. However, a fluorine-containing polymer is a material which inherently has poor adhesive properties, and in many cases, no adequate adhesive strength can be obtained if e.g. a film of a fluorine-containing polymer is laminated directly on a substrate. Even when an adhesive strength can be obtained to some extent, such an adhesive strength is likely to vary depending upon the type of the material of the substrate, whereby the reliability of the adhesion has been inadequate in many cases.

An adhesive to bond a fluorine-containing polymer is known. However, such an adhesive is poor in the chemical resistance or water resistance as compared with the fluorine-containing polymer and has frequently caused a problem for a laminate employing a fluorine-containing polymer. Further, in order to use such an adhesive, it has been required to use a primer, or to apply surface treatment to the fluorine-containing polymer, in many cases.

Under these circumstances, it is an object of the present invention to provide a fluorine-containing polymer having excellent adhesive properties.

It is another object of the present invention to provide a laminate employing such an adhesive fluorine-containing polymer, such as a laminate having such an adhesive fluorine-containing polymer laminated on a substrate made of various organic materials or inorganic materials, or a laminate in which such an adhesive fluorine-containing polymer is used as an adhesive to laminate another fluorine-containing polymer on a substrate made of various materials.

The present invention provides an adhesive fluorine-containing polymer comprising a fluorine-containing polymer having hydrogen atoms bonded to carbon atoms of its main chain and a grafting compound having a linking group capable of grafting to the fluorine-containing polymer and a functional group capable of providing an adhesive property, grafted to the fluorine-containing polymer.

The present invention also provides a method for producing an adhesive fluorine-containing polymer, which comprises melt-mixing a fluorine-containing polymer having hydrogen atoms bonded to carbon atoms of its main chain, a grafting compound having a linking group capable of grafting to the fluorine-containing polymer and a functional group capable of providing an adhesive property, and a radical-forming agent, at a radical-forming temperature, to graft the grafting compound to the fluorine-containing polymer.

Further, the present invention provides a method for forming a grafted fluorine-containing polymer, which comprises melt-mixing a fluorine-containing polymer having hydrogen atoms bonded to carbon atoms of its main chain, a grafting compound having a linking group capable of grafting to the fluorine-containing polymer and a functional group capable of providing an adhesive property, and a radical-forming agent, in a molding machine at a radical-forming temperature, to graft the grafting compound to the fluorine-containing polymer and at the same time, molding the grafted fluorine-containing polymer.

The present invention further provides a laminate comprising a layer of the above-mentioned adhesive fluorine-containing polymer and a layer of a resin made of another polymer laminated to the adhesive fluorine-containing polymer.

Still further, the present invention provides a method for producing a laminate having a grafted fluorine-containing polymer layer, which comprises melt-mixing a fluorine-containing polymer having hydrogen atoms bonded to carbon atoms of its main chain, a grafting compound having a linking group capable of grafting to the fluorine-containing polymer and a functional group capable of providing an adhesive property, and a radical-forming agent, in a co-extrusion molding machine at a radical-forming temperature, to graft the grafting compound to the fluorine-containing polymer and at the same time, co-extrusion molding the grafted fluorine-containing polymer together with another material to produce a laminate.

Now, the present invention will be described in detail with reference to the preferred embodiments.

The fluorine-containing polymer before grafting, to be used in the present invention, is a fluorine-containing polymer of the type which has fluorine atoms on carbon atoms of its main chain. Further, it is required to have hydrogen atoms bonded to carbon atoms of its main chain. Such a fluorine-containing polymer has a characteristic such that, as compared with fluorine atoms, the hydrogen atoms bonded to the main chain are relatively unstable and readily removed from the carbon atoms by the action of radicals. To the radicals of the carbon atoms from which the hydrogen atoms have been removed, the linking group of the grafting compound will bond, whereby grafting takes place. In the present invention, the grafting compound thus grafted, has a functional group capable of providing an adhesive property, whereby an adhesive property is imparted to the fluorine-containing polymer.

It is per se known to graft a compound having a linking group capable of grafting to a fluorine-containing polymer. For example, it is known to graft a compound having a crosslinkable group, followed by crosslinking, to obtain a crosslinked fluorine-containing polymer. Japanese Unexamined Patent Publication No. 115234/1990 discloses that vinyl trimethoxysilane is grafted to polyvinylidene fluoride under the action of a peroxide, followed by crosslinking with water to obtain a crosslinked polyvinylidene fluoride. However, it is not known that the grafted polyvinylidene fluoride before crosslinking has an adhesive property and is useful for bonding to other materials.

As the fluorine-containing polymer before grafting to be used in the present invention, a homopolymer or a copolymer of a fluoroolefin is preferred. However, in a case of a fluoroolefin having no hydrogen atom on either one of the two carbon atoms of the polymerizable unsaturated group, such as tetrafluoroethylene or chlorotrifluoroethylene, it is necessary to copolymerize it with a monomer having at least one hydrogen atom on either one of the two carbon atoms of the polymerizable unsaturated group.

As the fluoroolefin having hydrogen atoms on the polymerizable unsaturated group, vinylidene fluoride or vinyl fluoride may, for example, be mentioned. A homopolymer of such a fluoroolefin can be used as the fluorine-containing polymer before grafting to be used in the present invention. Further, a copolymer of such a monomer with another monomer may also be employed. As such another monomer, various fluorine-containing monomers as well as monomers containing no fluorine atom, may be employed.

As the monomer to be copolymerized with a fluoroolefin having no hydrogen atom on either one of the two carbon atoms of the polymerizable unsaturated group, an olefin (namely, a hydrocarbon type olefin) is preferred. Particularly preferred is an α-olefin such as ethylene, propylene or butene. However, the monomer is not limited to an α-olefin, and various monomers including fluoroolefins having hydrogen atoms on the unsaturated groups, such as vinylidene fluoride and (perfluorobutyl)ethylene, vinyl ethers such as an alkylvinyl ether and a (fluoroalkyl)vinyl ether, and (meth)acrylates such as a (fluoroalkyl) methacrylate and a (fluoroalkyl) acrylate, may be used. Further, together with such a monomer, a monomer having no hydrogen atom on the polymerizable unsaturated group, such as hexafluoroproplylene or a perfluoro(alkylvinyl ether) may be used as a third monomer.

In the present invention, preferred as the fluorine-containing polymer before grafting is a tetrafluoroethylene-ethylene copolymer, a tetrafluoroethylene-propylene copolymer, a homopolymer or copolymer of vinylidene fluoride, or a homopolymer or copolymer of vinyl fluoride.

As the tetrafluoroethylene-ethylene copolymer, the one in which tetrafluoroethylene and ethylene are copolymerized in a molar ratio of from 70/30 to 30/70, or the one wherein these monomers are copolymerized with one or more fluoroolefins or hydrocarbon olefins such as propylene, is, for example, preferred.

As the tetrafluoroethylene-propylene copolymer, the one wherein tetrafluoroethylene and propylene are copolymerized in a molar ratio of from 70/30 to 30/70, or the one wherein these monomers are copolymerized with one or more fluoroolefins or hydrocarbon olefins, is, for example, preferred.

As the vinylidene fluoride polymer, a homopolymer of vinylidene fluoride or a copolymer of vinylidene fluoride with various olefins or fluoroolefins, is, for example, preferred. Likewise, as the vinyl fluoride polymer, a homopolymer of vinyl fluoride, or a copolymer of vinyl fluoride with various olefins or fluoroolefins, is, for example, preferred.

In a case where the preferred fluorine-containing polymer is a copolymer, and the comonomer is a monomer containing no fluorine atom, it is preferred that the proportion of polymerized units of the fluorine-containing monomer in the fluorine-containing polymer is at least 40 mol %, particularly at least 50 mol %, based on the total polymerized units.

If the proportion of the polymerized units of the fluorine-containing monomer is lower than this range, the characteristic properties such as the chemical resistance, weather resistance and surface properties, of the fluorine-containing polymer tend to deteriorate.

There is no particular limitation as to the molecular weight of the fluorine-containing polymer. It is useful within a wide range from a low molecular weight product which is liquid at room temperature to a high molecular weight product which is rubber or a thermoplastic resin. Preferably, it is a polymer which is solid at room temperature, and it is useful by itself as a thermoplastic resin, elastomer or a rubber. For the production of such a polymer, any one of various conventional methods such as bulk polymerization, suspension polymerization, emulsion polymerization and solution polymerization, may be employed.

In the present invention, the most preferred fluorine-containing polymer is the above-mentioned tetrafluoroethylene-ethylene copolymer. This copolymer is referred to simply as ETFE. ETFE is thermoplastic and can be readily formed into a film or sheet. Yet, it is excellent in mechanical properties such as strength and also has good chemical resistance, weather resistance and surface properties. As described hereinafter, even when a grafting compound is grafted thereto, these properties can be maintained, and improvement of the adhesive property by the grafting is remarkable. As such ETFE, a commercially available product may also be used for the present invention.

By grafting a grafting compound to the fluorine-containing polymer, it is possible to obtain a fluorine-containing polymer having a large adhesive strength even to a material to which the adhesion used to be inadequate or impossible. The linking group in the grafting compound is a group which makes grafting to the fluorine-containing polymer possible. As such a linking group, an unsaturated or saturated hydrocarbon group which is involved in addition or association of radicals, or an amino group or a phenol group which is involved in nucleophilic reaction, may, for example, be mentioned. Further, it may be a group which readily forms radicals, such as a peroxy group or an azo group. Preferred linking groups include a group having a carbon-carbon unsaturated bond (particularly an organic group having an α,β-unsaturated double bond at its terminal), a peroxy group and an amino group.

The functional group capable of providing an adhesive-property is a group having a reactivity or polarity, which is capable of imparting an adhesive property to the grafted fluorine-containing polymer. Two or more such functional groups may be present per molecule of the grafting compound. Such two or more functional groups may be the same or different from one another. Such a functional group may, for example, be a carboxyl group, a residual group having two carboxyl groups in one molecule condensed by dehydration (hereinafter referred to as a carboxylic acid anhydride residue), an epoxy group, a hydroxyl group, an isocyanate group, an ester group, an acid amide group, an aldehyde group, an amino group, a hydrolyzable group containing a silyl group or a cyano group.

Preferred as the functional group capable of imparting an adhesive property are a carboxyl group, a carboxylic anhydride residue, an epoxy group and a hydrolyzable group containing a silyl group. Particularly preferred is a carboxylic anhydride residue.

Preferred as the grafting compound is a compound which, as mentioned above, has a linking group selected from the group consisting of an organic group having an α,β-unsaturated double bond at its terminal, a peroxy group and an amino group, and at least one functional group selected from the group consisting of a carboxyl group, a carboxylic anhydride residue, an epoxy group and a hydrolyzable group containing a silyl group. Most preferred is an unsaturated polycarboxylic anhydride, and then, an unsaturated carboxylic acid, an epoxy group-containing unsaturated compound, a silyl-containing hydrolyzable group-containing unsaturated compound or an epoxy group-containing peroxy compound is, for example, preferred.

The unsaturated polycarboxylic anhydride may, for example, be maleic anhydride, itaconic anhydride, citraconic anhydride, crotonic anhydride, bicyclo[2.2.1]hept-2-ene-5,6-dicarboxylic anhydride, the unsaturated carboxylic anhydride may, for example, be acrylic acid, methacrylic acid, maleic acid, monomethyl maleate, fumaric acid, itaconic acid, citraconic acid, crotonic acid, or bicyclo[2.2.1]hept-2-ene-5,6-dicarboxylic acid.

The epoxy group-containing unsaturated compound may, for example, be glycidyl acrylate, glycidyl methacrylate, allyl glycidyl ether or allyl glycidyl ester.

Preferred as the silyl-containing hydrolyzable group-containing unsaturated compound is a compound wherein one organic group containing an unsaturated group such as a vinyl group, an allyl group, a methacryloyloxyalkyl group or an acryloyloxyalkyl group and two or three hydrolyzable groups such as alkoxy groups or acyl groups are bonded to a silicon atom. When one unsaturated group-containing organic group and at least one, preferably two or three hydrolyzable groups are bonded to a silicon atom, the remaining group is preferably a lower alkyl group such as a methyl group. Specifically, such a silyl-containing hydrolyzable group-containing unsaturated compound may, for example, be vinyl trimethoxysilane, vinyl triethoxysilane, vinyl triacetoxysilane, γ-methacryloxypropyltrimethoxysilane or vinyl tris(β-methoxyethoxy)silane.

The peroxy compound may, for example, a diacyl peroxide, a ketone peroxide, a hydroperoxide or a peroxy carbonate, and it may further be a compound having the above described functional group. As the peroxy compound, a grafting compound of a polymer type which will be described hereinafter, is particularly preferred.

The following unsaturated compounds may, for example, be mentioned as grafting compounds other than those described above: an unsaturated compound having a hydroxyl group such as allyl alcohol, N-methylol acrylamide or N-methylol methacrylamide; an unsaturated carboxylate such as methyl acrylate, methyl methacrylate, dimethyl maleate, diethyl fumarate, dimethyl itaconate or diethyl citraconate; an unsaturated amide such as acrylamide, N-methylacrylamide or N,N-dimethylmethacrylamide; an unsaturated amine such as allyl amine, methylaminoethyl methacrylate, t-butylaminoethyl methacrylate or aminostyrene; an unsaturated compound having a cyano group such as cyano acrylate or cyano methacrylate; and an unsaturated aldehyde such as aclorein or croton aldehyde.

As described above, the grafting compound may be a compound having a saturated hydrocarbon group which is involved in addition or association of radicals or a compound having an amino group or a phenol group which is involved in a nucleophilic reaction, other than the above unsaturated group-containing compound. The following compounds may, for example, be mentioned as the grafting compound of this type: a compound having two or more amino groups, or a compound having an amino group and another functional group, such as hexamethylenediamine, ethanolamine, diethanolamine, triethanolamine, γ-aminopropyltriethoxysilane, N-β(aminoethyl)γ-aminopropylmethyldimethoxysilane, N-β(aminoethyl)γ-aminopropylmethyldimethoxysilane, or γ-anilinopropyltrimethoxysilane.

The grafting compound may be a polymer having a linking group such as a peroxy group or an amino group and a functional group capable of providing an adhesive property. For example, a copolymer of a polymerizable unsaturated peroxide such as t-butylperoxymethacryloyloxyethyl carbonate with a polymerizable unsaturated compound having a carboxyl group, a carboxylic anhydride residue, an epoxy group or a hydrolyzable group containing a silyl group, can be used as the grafting compound. Likewise, a copolymer obtained by copolymerizing a polymerizable unsaturated amine with the above-mentioned polymerizable unsaturated compound having a functional group, may also be used.

The amount of the grafting compound to be used for grafting is usually from 0.01 to 100 parts by weight, preferably from 0.1 to 20 parts by weight, per 100 parts by weight of the fluorine-containing polymer. In the case of a grafting compound of a polymer type, it may be used in a larger amount. However, the upper limit is preferably at a level of about 50 parts by weight. A preferred amount of the grafting compound other than the polymer type, is from 0.5 to 10 parts by weight. If the amount of the grafting compound used, is too small, it will be difficult to obtain a fluorine-containing polymer having an adequate adhesive property. On the other hand, if the amount is too much, the excellent properties of the fluorine-containing polymer tend to be impaired.

As a method for grafting the grafting compound to the fluorine-containing polymer, a method is preferred wherein both reactants are subjected to an association reaction in the presence of a radical-forming agent. However, when a radical-forming grafting compound such as a compound having a peroxy group is employed, it is unnecessary to use other radical-forming agent. The amount of the radical-forming agent is not particularly limited, but is usually from 0.1 to 10 parts by weight per part by weight of the grafting compound.

The grafting is believed to be accomplished by the following reaction mechanism. Firstly, a radical formed from the radical-forming agent will remove a hydrogen atom from the fluorine-containing polymer to form a fluorine-containing polymer radical. On the other hand, a radical formed from the radical-forming agent will attach to the grafting compound or will remove a hydrogen atom from the grafting compound to form a radical. Then, both radicals will associate to complete grafting. Otherwise grafting can be achieved also by direct addition of the fluorine-containing polymer radical to an unsaturated hydrocarbon group of the grafting compound. Grafting is believed to occur also by various other reaction mechanisms.

The grafting reaction is preferably conducted by melt-mixing the fluorine-containing polymer and the grafting compound, together with a radical-forming agent when such a radical-forming agent is required, at a radical-forming temperature. In some cases, a solvent may be used to form a fluorine-containing polymer solution, and the grafting reaction may be conducted in this solution. It is most preferred to employ a method wherein the grafting reaction is carried out while conducting the melt-mixing in an extrusion molding machine or an injection molding machine. The grafted fluorine-containing polymer may be formed into a molding material such as pellets. Further, the grafting may be conducted in a molding machine such as an extrusion molding machine, followed by molding to obtain a molded product.

It is preferred that the radical-forming agent to be used for the grafting reaction has a decomposition temperature within a range of from 120 to 350° C. and its half-life period at the grafting reaction temperature is about one minute. Specifically, benzoyl peroxide, dichlorobenzoyl peroxide, dicumyl peroxide, 2,5-dimethyl-2,5-di(benzoylperoxy)hexyne-3,1,4-bis(tert-butylperoxyisopropyl)benzene, lauroyl peroxide, t-butyl peracetate, 2,5-dimethyl-2,5-di(t-butylperoxy)hexyne-3,2,5-dimethyl-2,5-di(t-butylperoxy)hexane, t-butyl perbenzoate or t-butyl perphenylacetate is, for example, preferred.

Likewise, as the above-mentioned polymerizable unsaturated peroxide, it is preferred that the decomposition temperature of the peroxy group in the copolymer is within a range of from 120 to 350° C., and the half-life period at the grafting reaction temperature is about one minute. As a specific polymerizable unsaturated peroxide, t-butyl peroxymethacryloyloxyethyl carbonate, t-butylperoxyallyl carbonate, t-amylperoxyacryloyloxyethyl carbonate, t-hexylperoxyacryloyloxyethyl carbonate, 1,1,3,3-tetramethylbutylperoxyacryloyoxyethyl carbonate, t-butylperoxy methacrylate, cumylperoxyacryloyloxyethyl carbonate or p-isopropylcumylperoxyacryloyloxyethyl carbonate is, for example, preferred.

The adhesive fluorine-containing polymer of the present invention can be used as a molding material for producing various molded products. In such a case, various fillers such as inorganic powder, glass fiber, carbon fiber, metal oxide or carbon, may be blended within a range not to impair the properties. Further, other than the fillers, a pigment, an ultraviolet absorbent or other optional additives may be mixed thereto depending upon the particular purpose. Further, other than such additives, a resin such as another fluorine resin or a thermoplastic resin may be incorporated to produce a blend resin. These additives may be incorporated to the grafting reaction system so that the grafting reaction is conducted in the presence of the additives.

Using the adhesive fluorine-containing polymer of the present invention as a molding material, a molded product can be produced by a conventional molding method such as injection molding, extrusion molding, co-extrusion molding, inflation molding, coating or insert molding employing a mold. Further, a laminate can be produced by co-extrusion molding. Further, a film or sheet may be produced, and such a film or sheet may be laminated with other molded product to obtain a laminate.

More preferably, the adhesive fluorine-containing polymer of the present invention is formed into a molded product by a method wherein the grafting and molding of the fluorine-containing polymer are carried out almost simultaneously. As mentioned above, at the time of conducting injection molding, extrusion molding, co-extrusion molding or inflation molding, grafting of the fluorine-containing polymer is carried out at the resin melt-mixing zone of the molding machine, and the molding is continuously conducted, to obtain a molded product of the adhesive fluorine-containing polymer. As the molded product, a molded product which can be used as a material for producing a laminate, such as a film or sheet is preferred. Such a film or a sheet may be laminated with another molded product to obtain a laminate.

The adhesive fluorine-containing polymer of the present invention is most preferably employed for producing a laminate utilizing its adhesive property. As a method for producing a laminate, it is preferred to employ a method wherein molding and production of a laminate are simultaneously conducted by co-extrusion molding. In such a case, it is preferred to employ a method wherein, as mentioned above, grafting of the fluorine-containing polymer and the co-extrusion molding are conducted substantially simultaneously. By conducting the grafting and the co-extrusion molding simultaneously, it is possible to obtain a laminate such as a laminated film, a laminated sheet, a laminated tube or a laminated pipe having a layer of the adhesive fluorine-containing polymer of the present invention, in one step.

The laminate in the present invention is a laminate which has at least one layer of the adhesive fluorine-containing polymer of the present invention, and at least one layer which is in contact with the layer of the adhesive fluorine-containing polymer of the present invention, is a layer other than the adhesive fluorine-containing polymer of the present invention (hereinafter referred to as a layer of the substrate). The material of the substrate is not particularly limited and may be made of various organic materials or inorganic materials. However, it is preferably made of various resins. More preferably, it is made of a thermoplastic resin to which melt molding such as extrusion molding can be applied. The material of the substrate may, for example, be a fluorine-containing elastomer or a fluorine-containing resin made of a fluorine-containing polymer other than the adhesive fluorine-containing polymer of the present invention. Particularly preferred is a melt-moldable fluorine-containing resin or fluorine-containing elastomer.

The laminate in the present invention is preferably a laminate whereby the characteristics of the adhesive fluorine-containing polymer of the present invention are fully provided. Namely, the adhesive fluorine-containing polymer of the present invention has a characteristic such that it not only has an adhesive property to a fluorine-containing resin or a fluorine-containing elastomer but also has an adhesive property to other materials such as other resins. Accordingly, it is possible to obtain, for example, a laminate having excellent interlaminar adhesion with a construction of Y/X/Z where X is the layer of the adhesive fluorine-containing polymer of the present invention, Y is the layer of the fluorine-containing elastomer or the fluorine-containing resin made of a fluorine-containing polymer other than the adhesive fluorine-containing polymer of the present invention, and Z is a layer made of a resin other than the resins for the layers X and Y. Further, a laminate with a construction of Y/X can be used as a surface coating material for various substrates or articles by virtue of the adhesive property of the layer X. For example, such a surface coating material of film form may be laminated on the surfaces of substrates made of various materials by e.g. heat pressing. Further, when the adhesive fluorine-containing polymer of the present invention has the same level of the high physical properties as the fluorine-containing polymer before grafting, a laminate with a construction of X/Z is also useful.

As a specific example of the laminate of the present invention, a laminated tube with a construction of ETFE/grafted ETFE/nylon may be mentioned (here, ETFS layer is an inner layer). This laminated tube can be produced in one step by co-extrusion molding. This laminated tube is excellent in the chemical property such as chemical resistance by virtue of the ETFE inner layer and excellent in the physical property such as the strength by virtue of the nylon outer layer and the grafted ETFE adhesive layer and has a feature that it is substantially free from exudation of gasoline. Accordingly, this laminated tube has an excellent property as a tube for transporting a liquid fuel for automobiles.

The substrate in contact with the adhesive fluorine-containing polymer layer of the present invention is not limited to the above resin and may, for example, be a substrate made of an inorganic material such as a metal sheet, a glass sheet or a ceramic sheet. Otherwise, it may be a composite substrate such as a resin-coated metal sheet. Further, the adhesive fluorine-containing polymer of the present invention may be coated on a substrate in the form of a solution or a powder.

As mentioned above, it is known to graft an unsaturated compound having a hydrolyzable group containing a silyl group as a crosslinkable group to polyvinylidene fluoride, followed by crosslinking with water. However, the crosslinked polyvinylidene fluoride is poor in the adhesive property, and with a polyvinylidene fluoride having a high crosslinking degree, melt-molding such as extrusion molding is difficult. Accordingly, in the present invention, when the functional group in the grafting compound has a crosslinkable property, it is necessary to carry out the molding and the lamination before the adhesive property or the moldability is lost by the progress of crosslinking of the crosslinkable functional groups of the grafted fluorine-containing polymer. Likewise, a film or sheet of the grafted fluorine-containing polymer is required to be laminated before the adhesive property is lost by the progress of crosslinking of the crosslinkable functional groups. After the final adhesion, molding or lamination has been completed, crosslinking by the crosslinkable functional groups may proceed.

The laminate in the present invention is preferably a laminate having a layer of a fluorine-containing polymer or the adhesive fluorine-containing polymer on its surface. By the presence of such a fluorine-containing polymer surface layer, properties of the fluorine-containing polymer, such as the chemical resistance, solvent resistance, oil resistance, gas barrier property, water repellency, oil repellency, weather resistance, corrosion resistance, water-proofing property and anti-soiling property, will be imparted to the surface of the substrate.

Now, the present invention will be described in further detail with reference to Examples. However, it should be understood that the present invention is by no means restricted to such specific Examples.

EXAMPLE 1

Using a three layer co-extrusion molding machine, a laminated tube with a construction of inner layer/intermediate layer/outer layer was molded so that the inner diameter was 6 mm, and the thicknesses of inner layer/intermediate layer/outer layer were 0.4 mm/0.2 mm/0.6 mm, respectively.

To the cylinder for forming the inner layer, a tetrafluoroethylene-ethylene copolymer [tetrafluoroethylene/ethylene/(perfluorobutyl)-ethylene=52/46.5/1.5 (molar ratio), hereinafter referred to as copolymer A] was supplied, and to the cylinder for forming the outer layer, nylon 12 (manufactured by Ube Kosan K.K.) was supplied. To the cylinder for forming the intermediate layer, a mixture comprising 100 parts by weight of a powder of the copolymer A, 1.1 parts by weight of maleic anhydride and 0.2 part by weight of dicumyl peroxide, was supplied and reacted at the melting zone of the cylinder at 330° C. for a residence time of one minute, to form a graft polymer, which was then transferred to the transport zone of the cylinder. The processing temperatures of the copolymer A, the graft polymer and the nylon 12 at the transport zone were 260° C., 240° C. and 260° C., respectively, and the temperature of the co-extrusion die was 260° C.

The peel strength of the obtained laminated tube was measured, whereby material breakage took place as between the layer of the copolymer A and the layer of the graft polymer, and the peel strength as between the layer of the graft polymer and the layer of the nylon 12 was 4.3 kg/cm.

EXAMPLE 2

Using a three layer co-extrusion molding machine, a laminated tube with a construction of inner layer/intermediate layer/outer layer was molded so that the inner diameter was 6 mm, and the thicknesses of inner layer/intermediate layer/outer layer were 0.4 mm/0.2 mm/0.6 mm, respectively.

To the cylinder for forming the inner layer, the copolymer A was supplied, and to the cylinder for forming the outer layer, PBT (product No.: 1401X07, manufactured by Toray Corporation) was supplied. To the cylinder for forming the intermediate layer, a mixture comprising 100 parts by weight of a powder of the copolymer A, 1.5 parts by weight of maleic anhydride and 0.2 part by weight of t-butyl hydroperoxide, was supplied and reacted at the melting zone of the cylinder at 330° C. for a residence time of one minute, to form a graft polymer, which was then transferred to the transport zone of the cylinder. The processing temperatures of the copolymer A, the graft polymer and the PBT at the transport zone were 260° C., 255° C. and 260° C., respectively, and the temperature of the co-extrusion die was 260° C.

The peel strength of the obtained laminated tube was measured, whereby material breakage took place as between the layer of the copolymer A and the layer of the graft polymer, and the peel strength as between the layer of the graft polymer and the layer of the PBT was 4.0 kg/cm.

EXAMPLE 3

Using a two layer co-extrusion molding machine, a laminated tube with a construction of inner layer/outer layer was molded so that the inner diameter was 6 mm, and the thicknesses of inner layer/outer layer were 0.3 mm/0.6 mm, respectively.

To the cylinder for forming the inner layer, a uniform mixture comprising 100 parts by weight of a powder of the copolymer A, 1.2 parts by weight of vinyl trimethoxysilane and 1.5 parts by weight of dicumyl peroxide, was supplied and reacted at the melting zone of the cylinder at 330° C. for a residence time of one minute, to form a graft polymer, which was then transferred to the transport zone of the cylinder. To the cylinder for forming the outer layer, the same nylon 12 as used in Example 1 was supplied. The processing temperatures of the graft polymer and the nylon 12 at the transport zone were 240° C. and 260° C., respectively, and the temperature of the co-extrusion die was 260° C.

The peel strength of this laminated tube was measured, whereby the peel strength was 5.5 kg/cm. Further, an immersion text (using fuel C) was conducted in accordance with JIS K6301 (1975), whereby the peel strength after immersion at 40° C. for 70 hours (hereinafter referred to as the immersion test peel strength) was 4.9 kg/cm.

EXAMPLE 4

Using a two layer co-extrusion molding machine, a laminated tube with a construction of inner layer/outer layer was molded, so that the inner diameter was 6 mm, and the thicknesses of inner layer/outer layer were 0.3 mm/0.6 mm, respectively.

To the cylinder for forming the inner layer, a uniform mixture comprising 100 parts by weight of a powder of polyvinylidene fluoride, 1.2 parts by weight of vinyl trimethoxysilane and 1.2 parts by weight of dicumyl peroxide, was supplied and reacted at the melting zone of the cylinder at 220° C. for a residence time of one minute, to form a graft polymer, which was then transferred to the transport zone of the cylinder. To the cylinder for forming the outer layer, the same nylon 12 as used in Example 1 was supplied. The processing temperatures of the graft polymer and the nylon 12 at the transport zone were 240° C. and 260° C., respectively, and the temperature of the co-extrusion die was 260° C.

The peel strength of this laminated tube was measured, whereby the peel strength was 4.9 kg/cm. Further, the immersion text peel strength was 4.1 kg/cm.

EXAMPLE 5

Using a two layer co-extrusion molding machine, a laminated tube with a construction of inner layer/outer layer was molded, so that the inner diameter was 6 mm, and the thicknesses of inner layer/outer layer were 0.3 mm/0.6 mm, respectively.

Preliminarily, 0.2 part by weight of benzoyl peroxide was added as a polymerization initiator to a mixture comprising 0.9 part by weight of t-butyl peroxymethacryloyloxymethyl carbonate, 23 parts by weight of styrene and 10 parts by weight of glycidyl methacrylate, and polymerization was carried out at a temperature of from 60 to 65° C. to obtain a polymer (hereinafter referred to as peroxy polymer A).

To the cylinder for forming the inner layer, a uniform mixture comprising 100 parts by weight of a powder of the copolymer A and 33 parts by weight of the peroxy polymer A, was supplied and reacted at the melting zone of the cylinder at 300° C. for a residence time of one minute, to form a graft polymer, which was then transferred to the transport zone of the cylinder. To the cylinder for forming the outer layer, the same nylon 12 as used in Example 1 was supplied. The processing temperatures of the graft polymer and the nylon 12 at the transport zone were 260° C. and 260° C., respectively, and the temperature of the co-extrusion die was 260° C.

The peel strength of this laminated tube was measured, whereby the peel strength was 3.6 kg/cm. Further, the immersion test peel strength was 3.2 kg/cm.

EXAMPLE 6

100 parts by weight of a powder of the copolymer A, 1.5 parts by weight of maleic anhydride and 1.5 parts by weight of dicumyl peroxide were preliminarily uniformly mixed and melt-mixed by a twin screw extruder at 300° C. for a residence time of one minute, to obtain a graft polymer having maleic anhydride grafted. This graft polymer was pressed at 300° C. to form a film having a thickness of 0.1 mm. On the other hand, a powder of nylon 12 (product No.: 5016XHP, manufactured by Toray Corporation) was press-molded at 240° C. to obtain a nylon film having a thickness of 0.1 mm. This nylon film and the above graft polymer film were pressed at a temperature of 220° C. to obtain a laminated film. The peel strength of this laminated film was 6.2 kg/cm. Further, the immersion test peel strength was 5.3 kg/cm.

EXAMPLE 7

100 parts by weight of a powder of polyvinyl fluoride, 1.5 parts by weight of maleic anhydride and 1.5 parts by weight of dicumyl peroxide were preliminarily uniformly mixed and melt-mixed by a twin screw extruder at 200° C. for a residence time of one minute, to obtain a graft polymer having maleic anhydride grafted. This graft polymer was pressed at 200° C. to obtain a film having a thickness of 0.1 mm. To this film, a nylon film having a thickness of 0.1 mm (the same as used in Example 6) was pressed at a temperature of 240° C. to obtain a laminated film. The peel strength of this laminated film was 3.8 kg/cm. Further, the immersion test peel strength was 3.2 kg/cm.

EXAMPLE 8

100 parts by weight of a powder of a tetrafluoroethylene-ethylene copolymer [tetrafluoroethylene/ethylene/propylene=40/30/30 (molar ratio)], 1.5 parts by weight of glycidyl methacrylate and 1.5 parts by weight of dicumyl peroxide were preliminarily uniformly mixed and melt-mixed by a twin screw extruder at 180° C. for a residence time of one minute, to obtain a graft polymer having glycidyl methacrylate grafted. This graft polymer was pressed at 120° C. to obtain a film having a thickness of 0.1 mm. This graft polymer film and the same nylon film as used in Example 6 were laminated at 120° to obtain a double-layer laminated film. The peel strength of this laminated film was 7.1 kg/cm. Further, the immersion test peel strength was 5.5 kg/cm.

EXAMPLE 9

100 parts by weight of a powder of a tetrafluoroethylene-propylene copolymer [tetrafluoroethylene/propylene=55/45 (molar ratio), hereinafter referred to as copolymer B], 1.5 parts by weight of maleic anhydride and 0.5 part by weight of dicumyl peroxide were preliminarily uniformly mixed and melt-mixed by a twin screw extruder at 200° C. for a residence time of two minutes, to obtain a graft polymer having maleic anhydride grafted. This graft polymer was laminated on the same film as used in Example 6 by calendar rolling to obtain a double layer laminated film. The peel strength of this laminated film was conducted, whereby the tetrafluoroethylene-propylene copolymer underwent cohesive failure.

EXAMPLE 10

100 parts by weight of a powder of polyvinylidene fluoride, 1.5 parts by weight of maleic anhydride and 1.5 parts by weight of dicumyl peroxide were preliminarily uniformly mixed and melt-mixed by a twin screw extruder at 220° C. for a residence time of one minute, to obtain a film having a thickness of 0.1 mm made of a graft polymer having maleic anhydride grafted. This graft polymer film was laminated with the same nylon 12 film as used in Example 6 at 240° C. to obtain a double layer laminated film. The peel strength of this laminated film was 6.5 kg/cm. Further, the immersion test peel strength was 6.1 kg/cm.

EXAMPLE 11

100 parts by weight of a vinylidene fluoride/hexafluoropropylene copolymer [vinylidene fluoride/hexafluoropropylene=95/5 (molar ratio)], 1.0 part by weight of maleic anhydride and 1.5 parts by weight of dicumyl peroxide were preliminarily uniformly mixed and melt-mixed by a twin extruder at 180° C. for a residence time of one minute, to obtain a film having a thickness of 0.1 mm made of a graft polymer having maleic is anhydride grafted. This graft polymer film was laminated with the same nylon 12 film as used in Example 6 to obtain a double layer laminated film. The peel strength of this laminated film was 4.2 kg/cm. Further, the immersion test peel strength was 3.9 kg/cm.

EXAMPLE 12

Using the same composition of starting materials for grafting copolymer A as used in Example 6, a film of a graft polymer having a thickness of 0.2 mm was prepared by an extrusion molding machine under the same grafting and molding conditions as in Example 1. This film of the grafted copolymer A was melted and laminated on a glass sheet at 330° C. The peel strength of this laminated was 5 kg/cm.

EXAMPLE 13

Using the same composition of starting materials for grafting copolymer A as used in Example 2, a film of a graft polymer having a thickness of 1 mm was prepared by an extrusion molding machine under the same grafting and molding conditions as in Example 2. This film of the grafted copolymer A was melted and laminated on a stainless steel (SUS-304) sheet. The peel strength of this laminated was 4.8 kg/cm.

COMPARATIVE EXAMPLE 1

A laminate with a construction of copolymer A/nylon 12 was prepared in the same manner as in Example 6 except that the copolymer A was used by itself in Example 6. The peel strength of this laminate was 0.1 kg/cm.

COMPARATIVE EXAMPLE 2

A laminated film with a construction of polyvinyl fluoride/nylon 12 was prepared in the same manner as in Example 7 except that polyvinyl fluoride was used by itself in Example 7. The peel strength of this film was 0.1 kg/cm.

COMPARATIVE EXAMPLE 3

The copolymer B as used in Example 9 was, without grafting, laminated with a film of nylon 12 by calender rolling. This laminate was subjected to a peel test, whereby the two films were found to be not bonded at all.

What is claimed is:

1. A laminate having at least two layers comprising a layer of an adhesive fluorine-containing polymer containing a fluorine-containing polymer having hydrogen atoms bonded to carbon atoms of its main chain and a grafting compound having a linking group capable of grafting to the fluorine-containing polymer and a functional group capable of providing an adhesive property, grafted to the fluorine-containing polymer, and a resin layer made of another polymer bonded to the adhesive fluorine containing polymer layer, wherein the grafting compound is a compound having a linking group selected from the group consisting of an organic group having an α,β-unsaturated double bond at its terminal, a peroxy group and an amino group, and at least one functional group selected from the group consisting of a carboxyl group, a carboxylic anhydride residue, an epoxy group and a hydrolyzable group containing a silyl group.

2. The laminate according to claim 1, wherein the fluorine-containing polymer is a tetrafluoroethylene-ethylene copolymer.

3. The laminate according to claim 1, the grafting compound is maleic anhydride.

4. The laminate according to claim 1, wherein the resin layer made of another fluorine-containing polymer is a resin layer made of another fluorine-containing polymer bonded to the adhesive fluorine-containing polymer layer.

5. A method for producing a laminate having a grafted fluorine-containing polymer layer, which comprises melt-mixing a fluorine-containing polymer having hydrogen atoms bonded to carbon atoms of its main chain, a grafting compound having a linking group capable of grafting to the fluorine-containing polymer and a functional group capable of providing an adhesive property, and a radical-forming agent, in a co-extrusion molding machine at a radical-forming temperature, to graft the grafting compound to the fluorine-containing polymer and at the same time, co-extrusion molding the grafted fluorine-containing polymer together with another material to produce a laminate, wherein the grafting compound is a compound having a linking group selected from the group consisting of an organic group having an α,β-unsaturated double bond at its terminal, a peroxy group and an amino group, and at least one functional group selected from the group consisting of a carboxyl group, a carboxylic anhydride residue, an epoxy group and a hydrolyzable group containing a silyl group.

6. The method for producing a laminate according to claim 5, wherein the fluorine-containing polymer is a tetrafluoroethylene-ethylene copolymer.

7. A laminate having at least two layers comprising a layer of an adhesive fluorine-containing polymer having hydrogen atoms bonded to carbon atoms of its main chain and a grafting compound having a linking group capable of grafting to the fluorine-containing polymer and a functional group capable of providing an adhesive property, grafted to the fluorine-containing polymer by the use of a radical-forming agent, at a radical-forming temperature, wherein the grafting compound is a compound having a linking group selected from the group consisting of an organic group having an α,β-unsaturated double bond at its terminal, a peroxy group and an amino group, and at least one functional group selected from the group consisting of a carboxyl group, a carboxylic anhydride residue, an epoxy group and a hydrolyzable group containing a silyl group.

* * * * *